United States Patent [19]

Phelan

[11] Patent Number: 5,060,205

[45] Date of Patent: Oct. 22, 1991

[54] ULTRASONIC DISTANCE MEASURING SYSTEM

[75] Inventor: James J. Phelan, Bettendorf, Iowa

[73] Assignee: Deere & Company, Moline, Ill.

[21] Appl. No.: 529,828

[22] Filed: May 29, 1990

[51] Int. Cl.$^5$ ............................................. G01S 15/00
[52] U.S. Cl. ........................................ 367/98; 367/99
[58] Field of Search ...................... 367/98, 99, 97, 112, 367/105

[56] References Cited

U.S. PATENT DOCUMENTS

| | | | |
|---|---|---|---|
| 3,454,922 | 7/1969 | Dory | 367/98 |
| 4,414,792 | 11/1983 | Bettencourt et al. | 56/10.2 |
| 4,573,124 | 2/1986 | Seiferling | 56/10.2 |
| 4,760,419 | 7/1988 | Fujiwara et al. | 356/1 |
| 4,910,717 | 3/1990 | Terry | 367/99 |

FOREIGN PATENT DOCUMENTS

B-39883/85 3/1985 Australia .
B-45626/85 7/1985 Australia .
A-78449/87 3/1988 Australia .

Primary Examiner—Daniel T. Pihulic

[57] ABSTRACT

A distance sensing system includes an ultrasonic transducer, a transceiver and a microcontroller-based signal processing unit. The transducer periodically generates and directs towards the terrain a dual frequency ultrasonic signal. Echo signals from the ground and/or any intervening crop or trash are reflected back to the transducer and are processed. The system generates amplified and filtered echo envelope signals. Leading and trailing edge times are determined as the times the echo signals cross a threshold value which is a certain proportion of a maximum echo amplitude value. A near distance value is derived from the leading edge time of the first echo which exceeds a minimum amplitude. A far distance value is determined as the trailing edge time of the last echo signal which has an amplitude which exceeds a certain value. Multiple echo time and amplitude values are derived from the maximum amplitude echo. These values are used to prevent echoes which occur after the multiple echo time with less than a certain amplitude from being used in the determination of the far distance value. This far distance value represents the distance to ground and weaker, earlier echoes from trash or crop and later, multiple echoes may be ignored.

19 Claims, 11 Drawing Sheets

Microfiche Appendix Included
(1 Microfiche, 20 Pages)

ULTRASONIC DISTANCE MEASURING SYSTEM

BACKGROUND

This application includes a microfiche appendix including one microfiche and 20 frames.

The present invention relates to an ultrasonic system for measuring the distance between a sensor and a surface.

Various systems have been proposed for measuring the distance between a vehicle or machine part and the ground over which it moves. This is desired in order to adjust the position of working tools or implements with respect to the terrain or soil surface. One such system is described in Australian Petty Patent Abridgement No. AU-A-78449/87, published 10 March 1988 wherein distance to the soil is measured by reflecting an ultrasonic signal off the soil surface. Variations in soil condition and type are compensated for by deriving the distance to the soil surface by averaging the leading and trailing edge times of an amplitude envelope of an echo signal reflected by the soil surface. However, this and other similar systems have not been able to function accurately in conditions where crops or trash lie on top of the ground surface. Accordingly, a distance or height sensing system which can distinguish between crop or trash and soil surface is desired.

SUMMARY

An object of the present invention is to provide a distance sensing system which can distinguish between ground level and trash or crop which may be lying on top of the ground.

These and other objects are achieved by the present invention which include an ultrasonic transducer, a transceiver and a microcontroller-based signal processing unit. The transducer periodically generates and directs towards the terrain a dual frequency ultrasonic signal. Echo signals from the ground and/or any intervening crop or trash are reflected back to the transducer and are analyzed by the signal processing unit. The system generates amplified and filtered echo envelope signals. The digitally measured amplitudes of these signals are adjusted by time dependent gain factors in software to compensate for distance related echo attenuation. Leading and trailing edge times are determined from the times the echo signals cross a threshold value which is a certain proportion of a maximum echo amplitude value. A near distance value is derived from the leading edge time of the first echo which exceeds a minimum amplitude. A far distance value is determined as the trailing edge time of the last echo signal which has an amplitude which exceeds a certain required amplitude value. Multiple echoes are caused when strong primary echoes reflect off the transducer face and make a second round trip to and from the target. Estimated multiple echo time and amplitude values are derived from the maximum amplitude echo. These values are used to prevent multiple echoes (which occur after the multiple echo time with less than a certain amplitude) from being used in the determination of the far distance value. This far distance value represents the distance to ground. Weaker, earlier echoes from trash or crop and later, multiple echoes are ignored The threshold value, the estimated multiple echo time and amplitude values, and the minimum required amplitude values are all variable in response to variations in the amplitude and time of the maximum amplitude echo.

DETAILED DESCRIPTION

Figure 1:
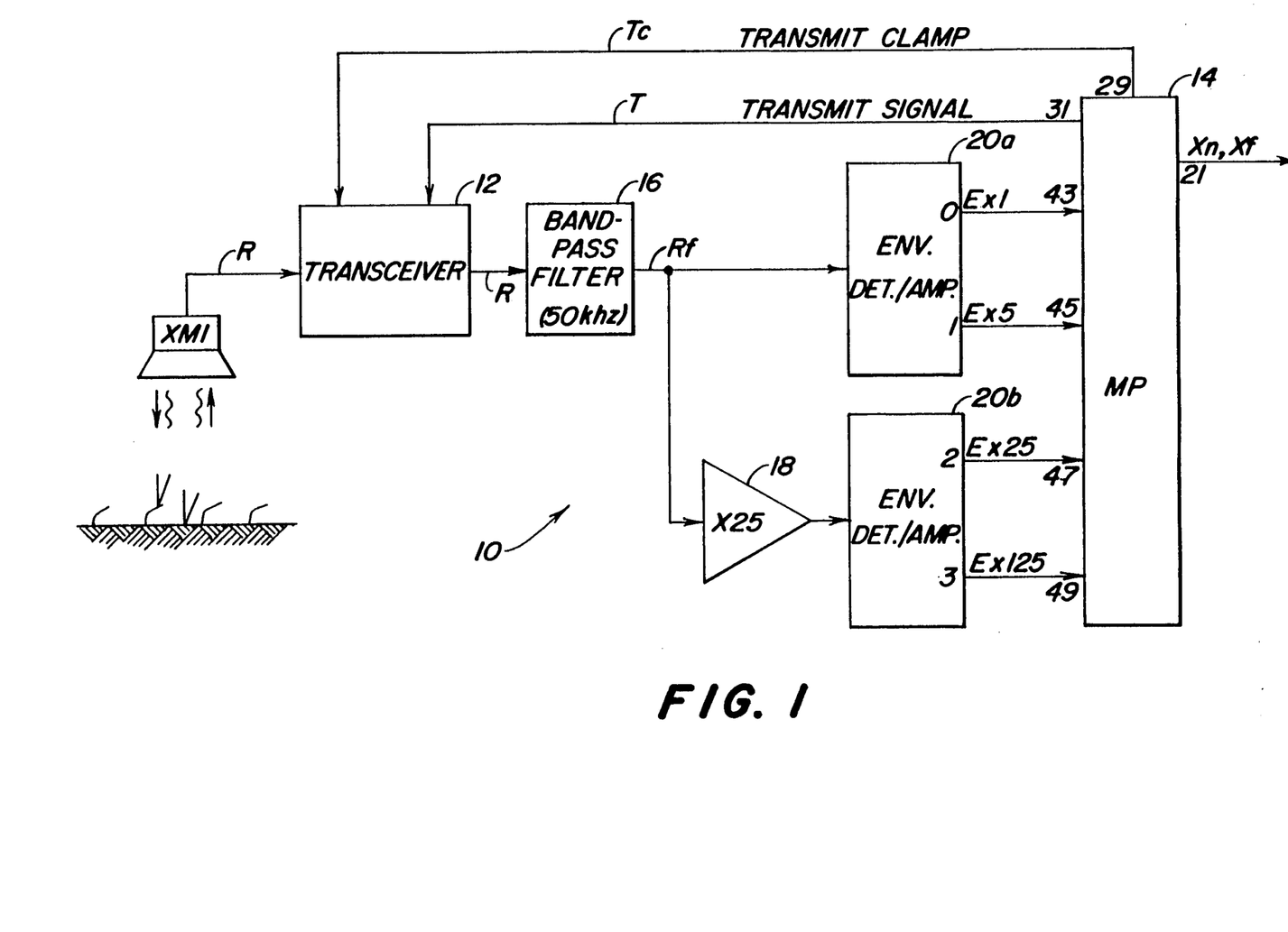
FIG. 1 is a simplified schematic block diagram of an ultrasonic distance measuring system according to the present invention.
Figure 2:
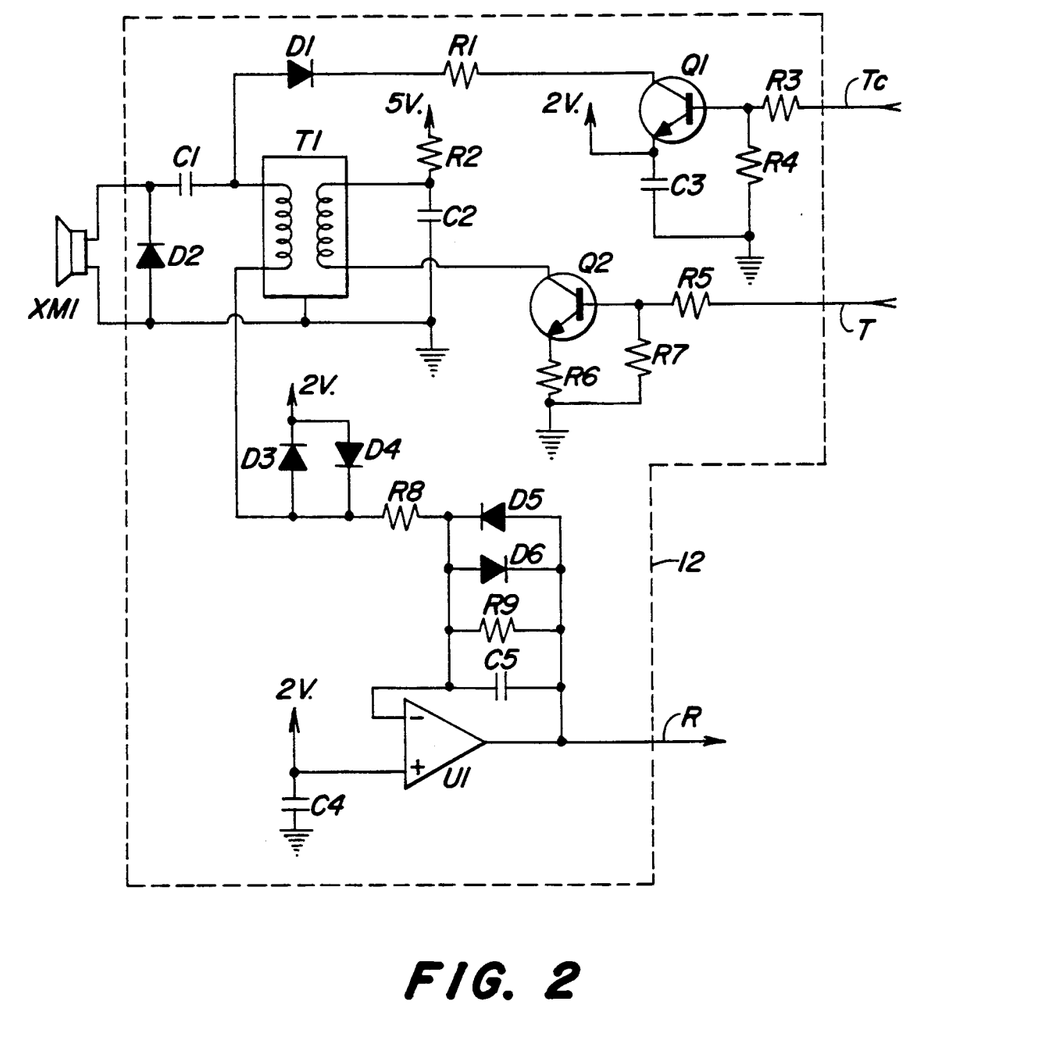
FIG. 2 is a detailed circuit diagram of the transceiver portion of FIG. 1.
Figure 3:
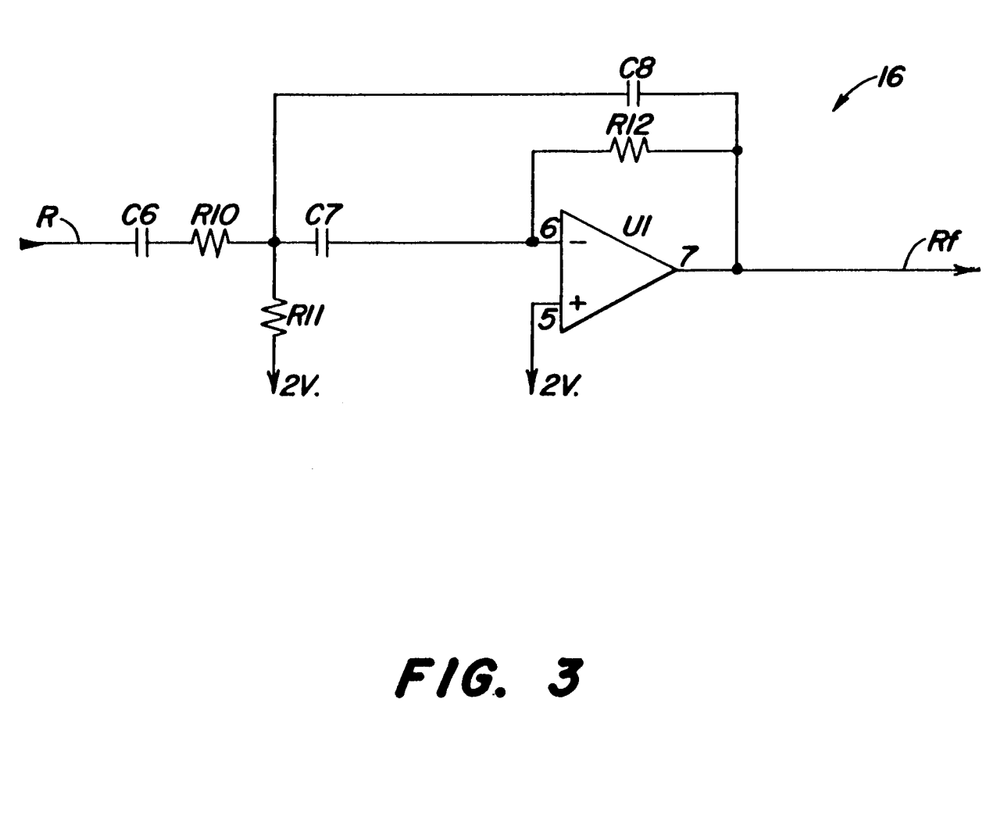
FIG. 3 is a detailed circuit diagram of the band-pass filter portion of FIG. 1.
Figure 6A:
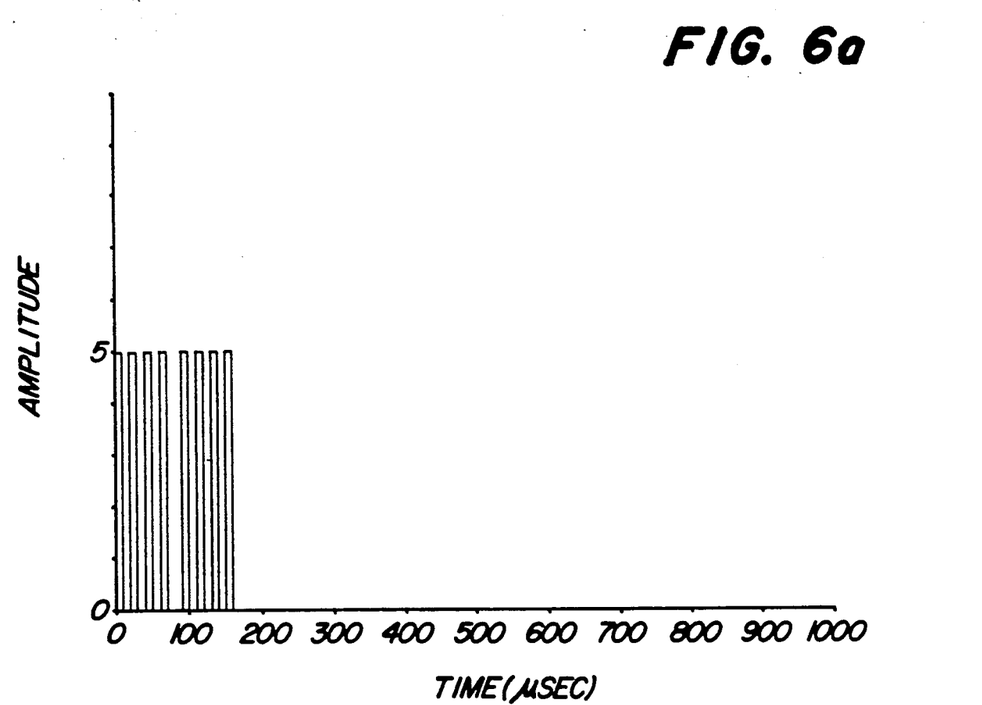
FIG. 6a is a signal timing diagram showing the transmit drive signal, T, which is generated by the microcontroller and applied to the transceiver circuit which generates an ultrasonic signal.
Figure 6B:
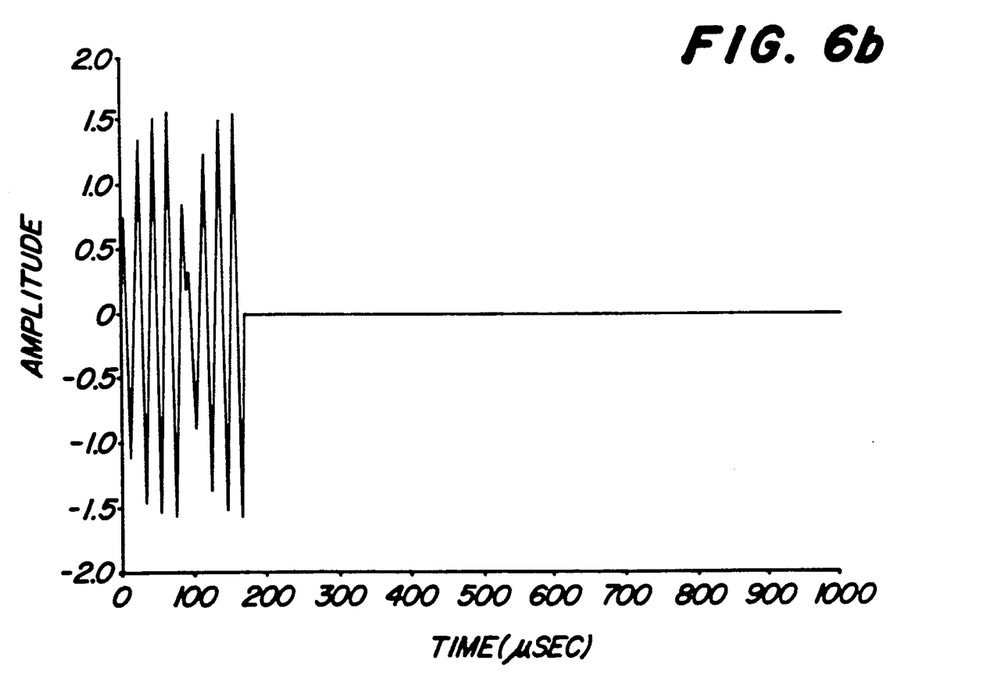
FIG. 6b is a signal timing diagram of the ultrasonic transmit acoustic pressure pulse generated by the transducer in the present invention.

Referring to FIG. 1, the distance sensing system 10 includes an ultrasonic transducer XM1, such as an electrostatic ultrasonic transducer part No. 607281 manufactured by Polaroid Corp., coupled to a transceiver 12. The transducer XM1 directs an ultrasonic acoustic signal towards the terrain or other surface for which distance information is desired. The terrain or surface reflects an ultrasonic acoustic echo back to transducer XM1 with a time delay related to the relative distance between the object and the transducer. The transceiver 12 is driven by a transmit drive signal, T, as best seen in FIG. 6a, with components at 45 and 55 kHz and a transmit mask or clamp signal Tc, both signals supplied by a microcontroller 14. The microcontroller is preferably a commercially available chip, such as the MC 68HC11 manufactured by Motorola, which includes a microprocessor with memory, timing and input/output hardware, such as an integral analog-to-digital (A/D) converter. The transceiver 12 provides the transmit signal to transducer XM1 which generates an ultrasonic transmit pulse as best seen in FIG. 6b. The transducer XM1 receives ultrasonic echo signals reflected from the terrain and from crop or trash which may cover the terrain. The echo or received signal, R, from transducer XM1 is provided to a second order band pass filter 16 with a center frequency of 50 kHz.

Figure 6C:
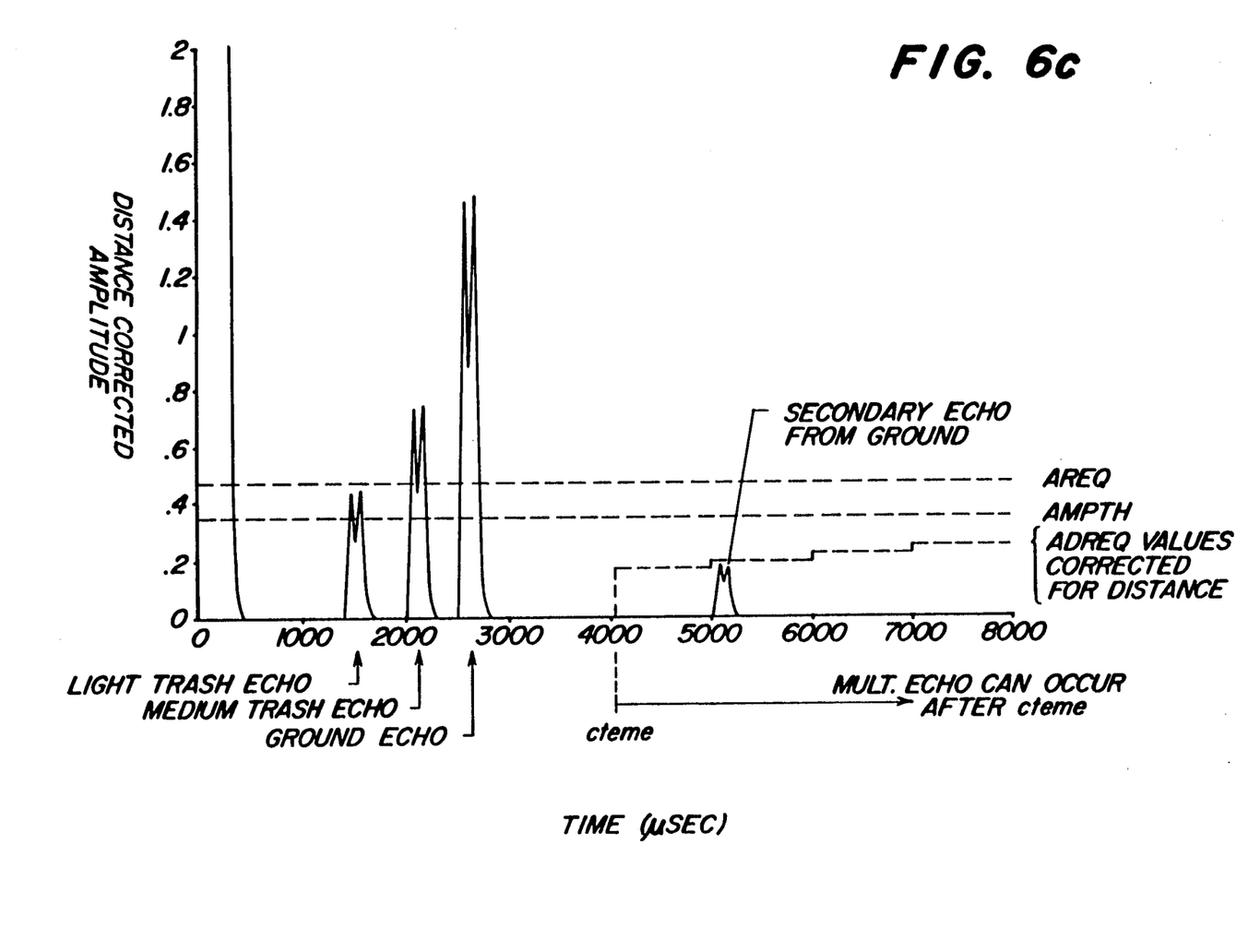
FIG. 6c is a signal timing diagram showing the distance corrected detect envelope of a typical set of echo signals reflected from trash and ground in response to the transmit signal shown in FIG. 6b.

The band pass filter 16 provides a filtered receive signal Rf to an amplifier 18 with a gain of 25 and to a multiple envelope detector/amplifier 20a. The output of amplifier 18 is coupled to an identical envelope detector/amplifier 20b. Thus, circuits 16, 18, 20a and 20b supply rectified, amplified and filtered envelope signals E with gains of 1, 5, 25 and 125, respectively, to four corresponding A/D input channels of the microcontroller 14. FIG. 6c shows the envelop of a set of typical trash and ground echo signals generated with the transducer 433 millimeters above the ground, a medium thick trash layer 86 millimeters above the ground and a slight trash layer 190 millimeters above the ground.

The microcontroller 14 receives the four amplified, filtered receive signals, executes an algorithm and produces an output signal S at pin 21 as a serial digital signal which contains information with respect to the distance between the surface and the transducer XM1. For more detailed information concerning the circuit shown in FIG. 1, reference is made to FIGS. 2-5 and the component examples set forth in the component tables.

Figure 4:
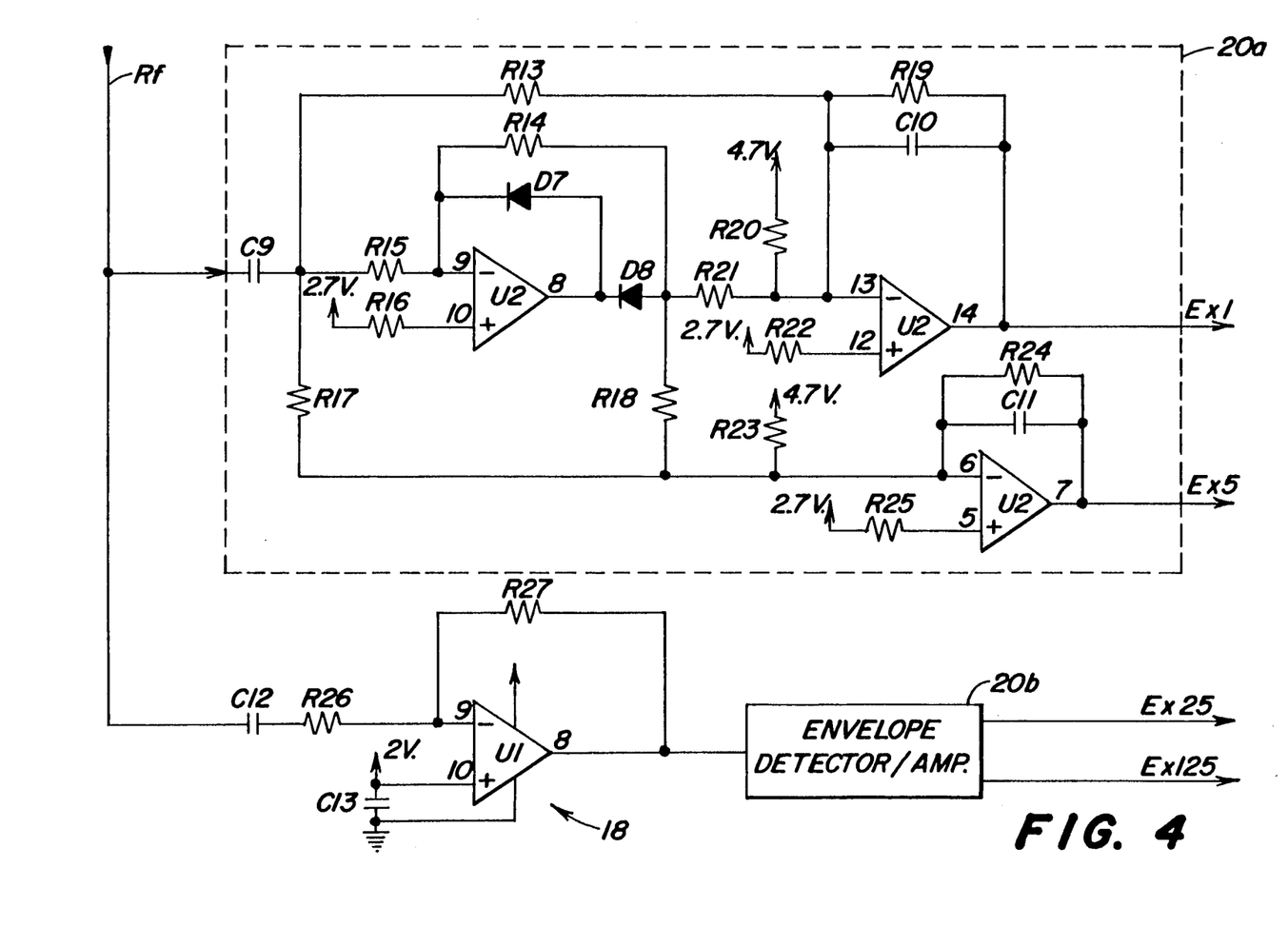
FIG. 4 is a detailed circuit diagram of the envelope detector/amplifier portion of FIG. 1.

Referring to FIG. 4, there is shown the amplifier 18 with a gain of 25 and a pair of identical dual envelope detector/amplifier circuits 20a, 20b, each with dual gains of 1 and 5.

Figure 5:
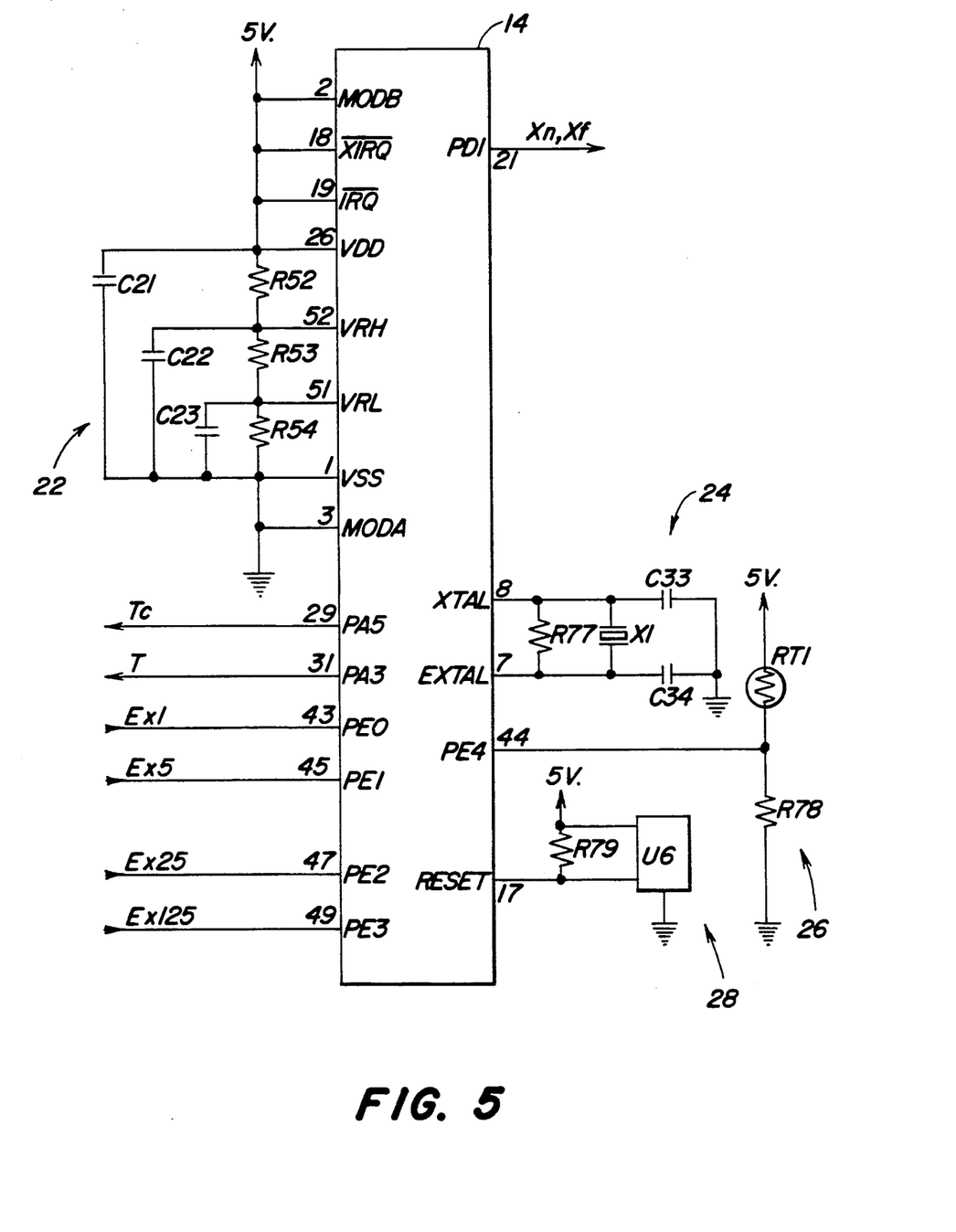
FIG. 5 is a detailed circuit diagram showing other circuits which are connected to the microcontroller of FIG. 1.

Referring to FIG. 5, a resistor/capacitor network 22 is coupled to the mode, power, interrupt and A/D reference inputs of the microcontroller 14. Also, connected to the micro 14 is a timing crystal circuit 24, a temperature sensing circuit 26, and a reset circuit 28.

Figure 7:
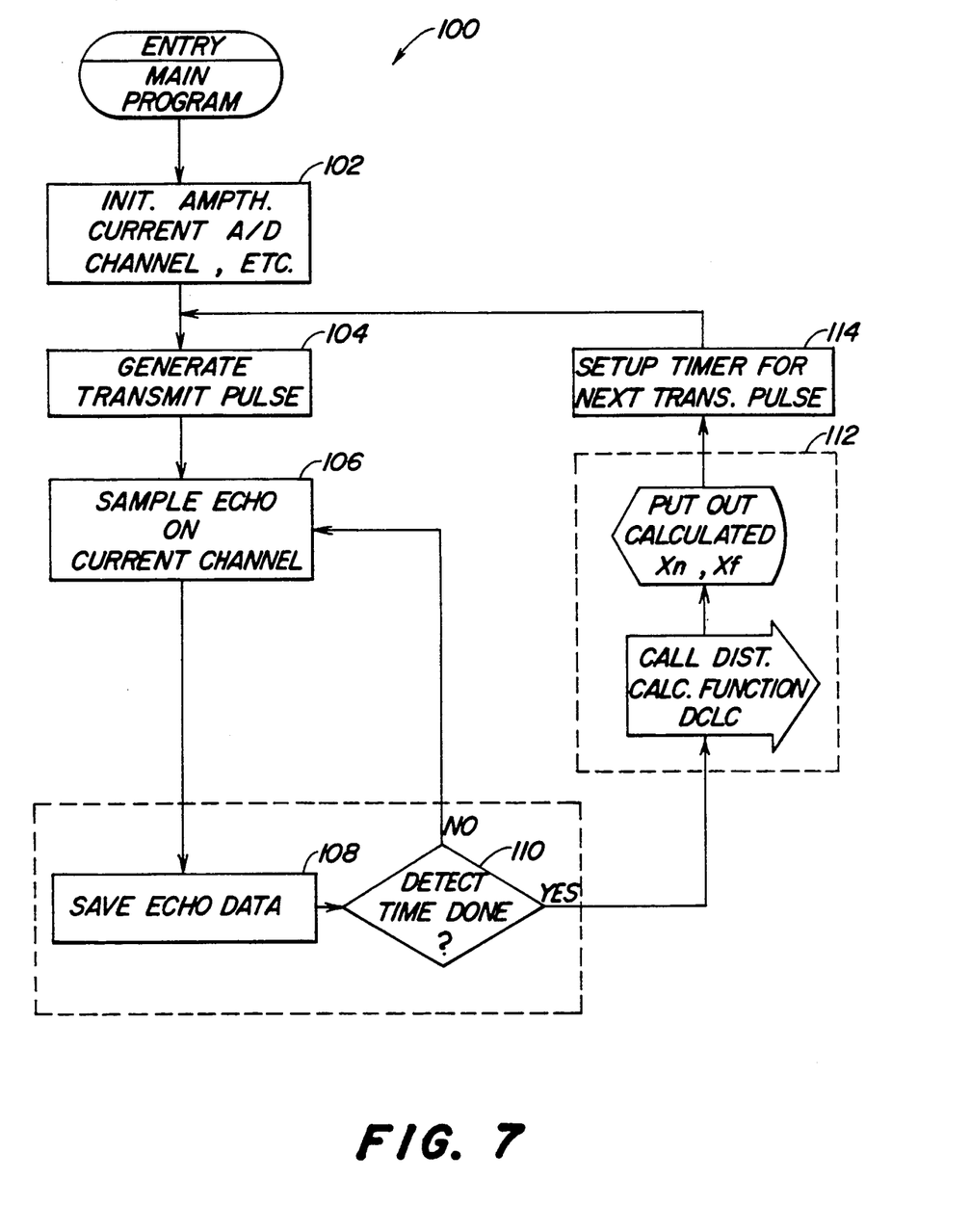
FIG. 7 is a simplified logic flow diagram of the main loop algorithm executed by the microcontroller of FIG. 1.
Figure 8:
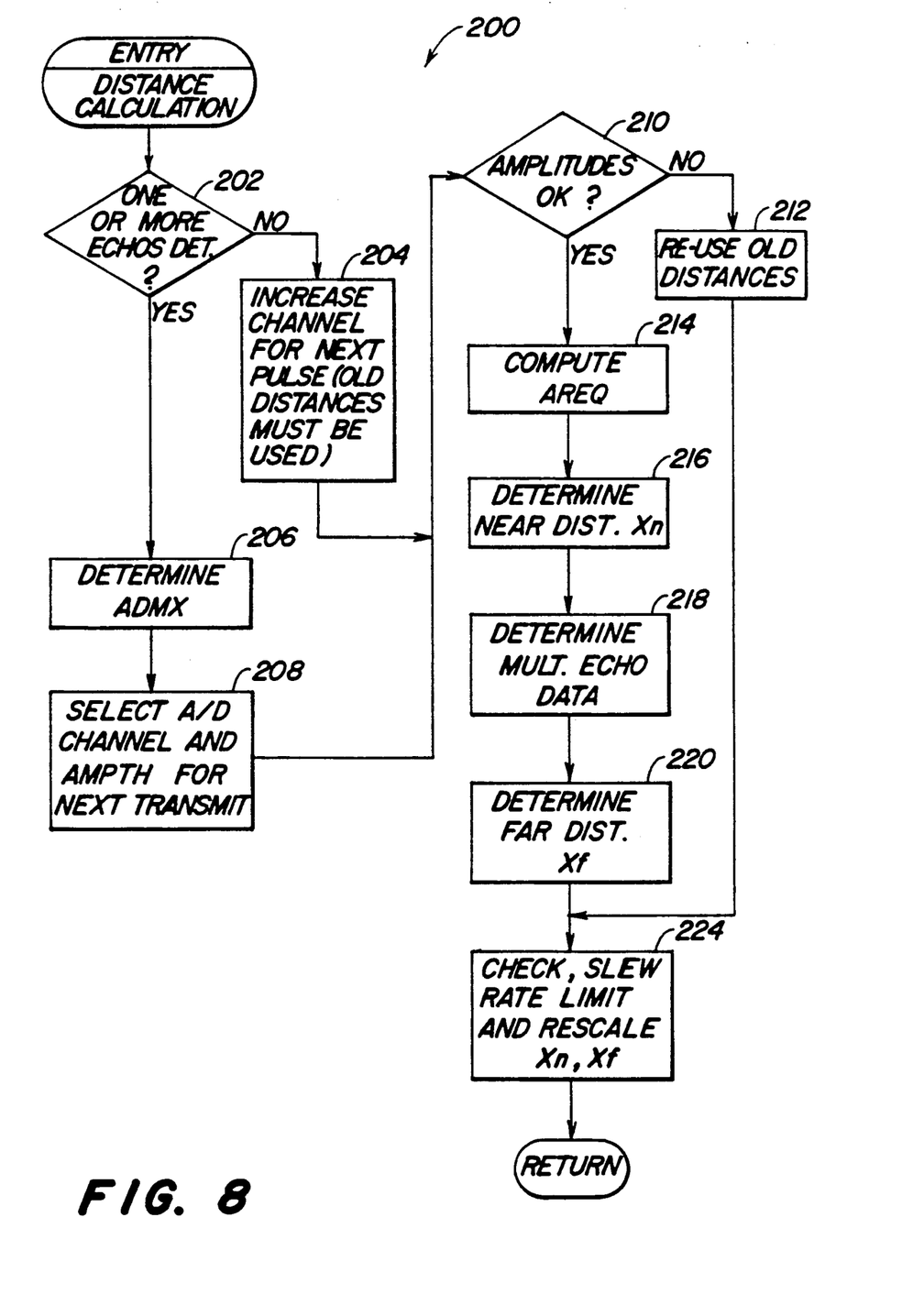
FIG. 8 is a simplified logic flow diagram of the distance calculating, threshold and gain adjusting subroutine called by the main loop algorithm of FIG. 7.

The micro 14 executes an algorithm represented by FIGS. 7 and 8. For further details regarding this algorithm, reference is made to the computer program listing included in the microfiche appendix. Portions of the computer program are in assembly language and portions are in C language. In the following description the term "distance corrected" is used in several places. This term refers to a preferred signal processing method in which the echo amplitude values are corrected for attenuation with distance by a time dependent gain factor which increases as a function of time from the transmit pulse. Referring now to FIG. 7, the main loop algorithm 100 executed by the micro 14 begins at step 102 with the initialization of an amplitude threshold value, AMPTH, the current A/D input channel (which determines which of the amplified echo signals E×1, E×5, E×25 or E×125 will be processed) and other registers.

Then step 104 causes the dual frequency transmit signal, T, to be out-putted to the transceiver 12, thus causing the transducer, XM1 to send an ultrasonic signal (the transmit pulse) towards the terrain or other surface. Then, 1 millisecond after the transmit pulse is transmitted, steps 106-110 operate for 10 milliseconds to sample the echo signal received by the selected A/D channel (the amplitude is read every 100 microseconds) and to save the data representing peak amplitudes, the leading edge times and the trailing edge times for all echo signals which have a distance corrected amplitude which exceeds the amplitude threshold, AMPTH. The leading and trailing edge times are the times at which the leading and trailing portions of each distance corrected echo signal crosses the amplitude threshold, AMPTH.

Then step 112 calls a subroutine 200 which operates to calculate near and far distance values Xn, Xf and to adjust, if necessary, the amplitude threshold value AMPTH and the selected A/D channel so that an echo envelope signal with an appropriate gain or amplification will be processed during the next cycle of the main loop algorithm. Step 112 then outputs the near and far distance values. Usually, the near distance will correspond to the distance to crop or trash which may lie on top of the ground surface, while the far distance will usually correspond to the distance to the ground surface.

Finally, step 114 returns the main loop to step 104 and controls the loop timing so that the main loop is executed about once every 32.4 milliseconds, for example.

Turning now to FIG. 8, there is shown a more detailed, but still somewhat simplified logic flow diagram of the subroutine 200 called by step 112 of the main loop algorithm. The subroutine 200 begins with step 202 which determines whether any echoes have been detected (exceeded the AMPTH threshold). If not, the algorithm is directed to step 204 which increments the selected A/D channel so that a more highly amplified echo signal will be processed after the next transmit pulse is transmitted. Step 204 also causes any old distance values to be re-used, and then directs the algorithm to step 210.

If at least one echo signal is received with a distance corrected amplitude exceeding the AMPTH threshold, then step 202 directs the algorithm to step 206 which determines the maximum uncorrected amplitude, ADMX, of all the detected echo signals. Then, step 208 adjusts the selected channel and the AMPTH threshold as a function of ADMX for use after the next transmit pulse is generated. In short, the A/D channel is adjusted or selected so that the A/D converter will not saturate. The AMPTH threshold is set equal to a certain percentage (25%) of AMX, which is the distance corrected value of ADMX. Thus, the AMPTH value will be automatically adjusted to compensate for changing echo signal strength.

The algorithm then proceeds to step 210. Step 210 directs the algorithm to step 212 and causes the old distance values to be re-used if the newly received echo signals are not adequate (or saturated) for the computation of new distance values. Otherwise, the algorithm proceeds to step 214 which computes a minimum required amplitude value, AREQ, which happens to be 25% of the AMX value.

Step 216 determines the near distance value, Xn, as the leading edge time (time at which the distance corrected signal crosses AMPTH) of the first echo signal which has a distance corrected amplitude which exceeds the minimum required amplitude value, AREQ. Thus, echo signals which are judged to be too weak are not utilized in the determination of the near distance value. This allows the system to ignore spurious, weak echoes from objects such as plants or grass which may be between the transmitter XM1 and the terrain surface or main cover layer. Also, in step 216, the near distance values are derived by subtracting from the leading edge time a correction factor which compensates for variations in signal rise times for echo envelope signals of different peak amplitudes.

Figure 9A:
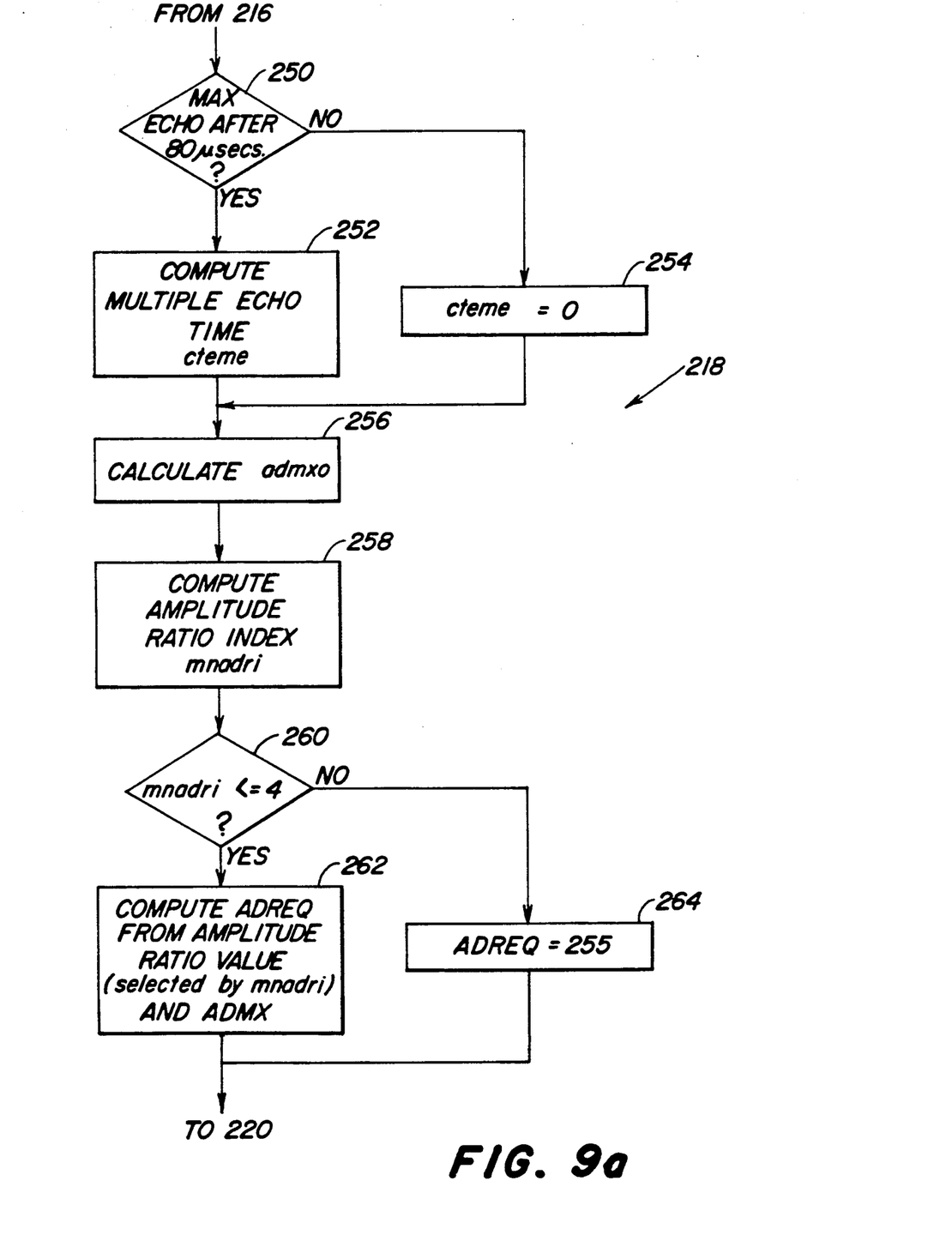
FIGS. 9a and 9b are detailed logic flow diagrams of portions of the logic flow diagram of FIG. 8.

Next, step 218 computes an expected or estimated time (see "cteme" in FIG. 6c) and an amplitude value (ADREQ) for a "multiple echo" (see "secondary echo" in FIG. 6c). A "multiple echo" is an echo which is received by the transceiver 12 after multiple reflections of a single transmit pulse. This data is derived from the echo with the largest peak amplitude previously identified in step 206. Step 218 is illustrated in more detail in FIG. 9a wherein step 250 directs the algorithm to step 254 where the multiple echo trailing edge time value, cteme, is set equal to 0, indicating that multiple echoes can occur at any time, if the maximum echo occurs within 80 microseconds of the detect start time (1) millisecond after the transmit time). Otherwise, the algorithm proceeds to step 252 which computes the cteme value as a function of the trailing edge time of the maximum amplitude echo. The maximum amplitude value is then normalized and scaled in step 256 to the value it would have been, admx0, had it been received on the channel with the lowest gain. In step 258 an amplitude ratio index, mnadri, is computed from admx0. This index will be used to select an amplitude ratio value from a table of stored amplitude ratio values which were determined experimentally and which represent the fact that the ratio of a multiple echo amplitude to the primary echo amplitude varies as a function of the peak amplitude of the primary echo. Then, for lower mnadri (and admx0) values steps 260 and 262 operate to derive the estimated multiple echo amplitude value, ADREQ, by multiplying the amplitude ratio value selected by mnadri by the ADMX value. For mnadri (and admx0) values, steps 260 and 264 set ADREQ equal to the largest possible echo amplitude so that, in the case of a large amplitude primary echo, no echo which occurs after the multiple echo time, cteme, will be utilized to determine the far distance value in step 220.

Figure 9B:
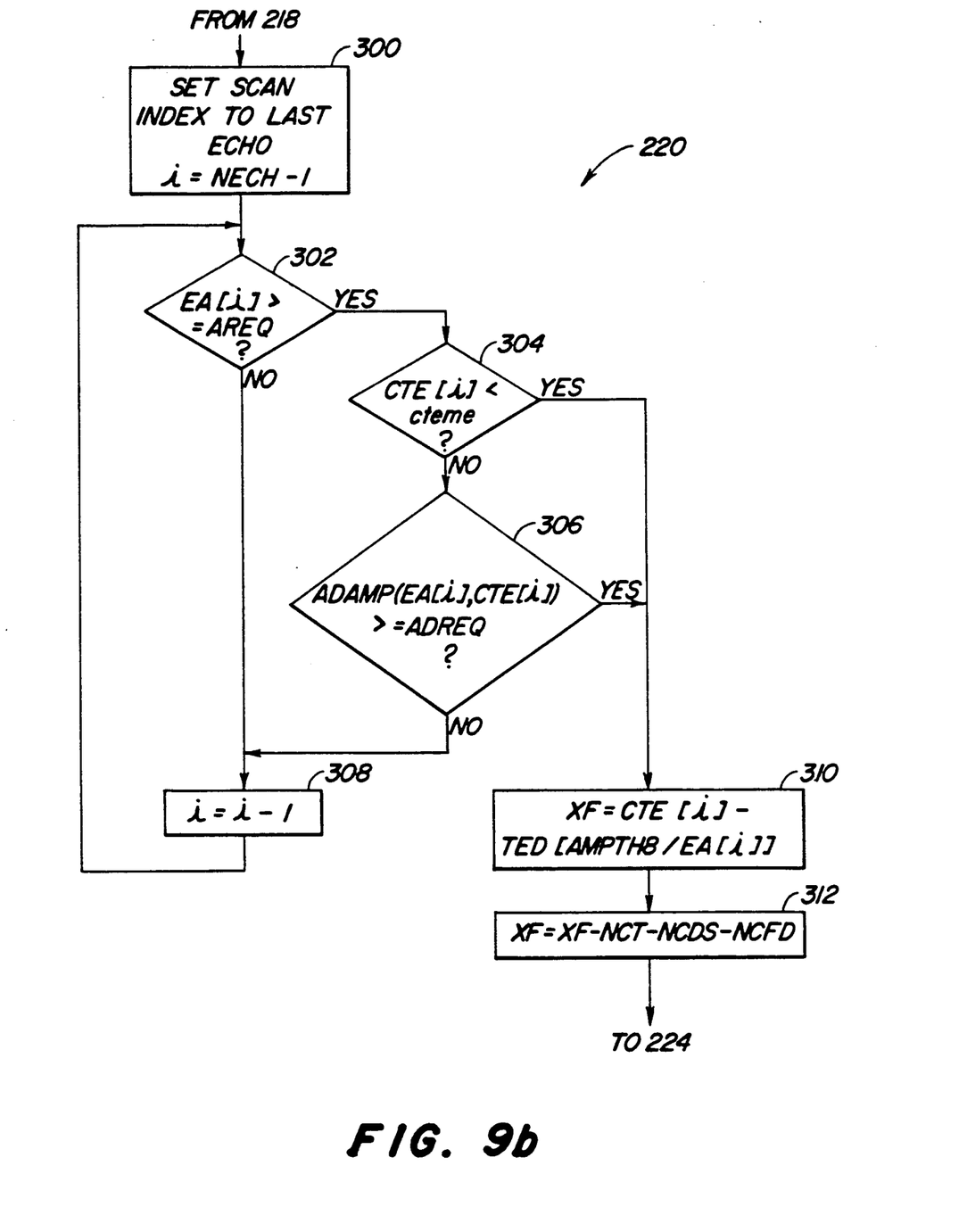

Then, in step 220, the far distance value, Xf, is determined as the trailing edge time of the last echo which has a distance corrected amplitude which exceeds AREQ, and which also has a distance uncorrected amplitude greater than the multiple echo amplitude determined in step 218 if such echo occurs after the multiple echo time. FIG. 9b illustrates in more detail the portion of the algorithm represented by step 220. Turning now to FIG. 9b, step 300 sets a scan index value (i) for the last echo. Then step 302 compares the distance corrected maximum echo amplitude EA(i), to a distance corrected required amplitude value, AREQ, derived from the uncorrected ADREQ value determined in step 214. If EA(i) is less than AREQ, then this trailing edge time will not be utilized to determine the far distance value and the index value is decremented for the next earlier echo in step 308 and the algorithm returns to step 302 for processing of the next earlier echo. If EA(i) exceeds AREQ, then the algorithm proceeds to step 304 which compares the trailing edge time CTE(i) of the last echo to the multiple echo time cteme determined from step 218. If the trailing edge time CTE(i) is prior to the multiple echo time, then the far distance value, Xf, is derived from the trailing edge time for this echo, CTE(i) in step 310. Also in step 310, the far distance value is corrected by one of a set of values which compensates for variations in signal decay time due to variations in echo signal amplitude. Finally, in step 312, the Xf value is scaled and the duration of the transmit pulse is subtracted therefrom.

Returning to step 304, if the trailing edge time is later than the multiple echo time, then step 304 directs the algorithm to step 306 which determines whether the uncorrected maximum echo amplitude, ADAMP-(EA[i], CTE[i]) is greater than or equal to the uncorrected required amplitude value, ADREQ. If this condition is not met, this echo is not used to determine the trailing edge time and the algorithm proceeds to previously described steps 308 and back to 302 for processing of the next earlier echo. If this condition is met, then the algorithm proceeds to steps 310 and 312 where the far distance value is determined as described previously.

Finally, in step 224, the Xn and Xf values are slew rate limited, filtered, rescaled and checked, and the calculated near distance, NDIS, and far distance, FDIS, values are established and the algorithm returns to the main loop.

The following is a table of components which may be used in the electronic circuits illustrated in FIGS. 2-5. These componenets are merely exemplary and other componenets could be utilized without departing from scope of the present invention.

| Schematic Designation | Component Table Description |
|---|---|
| T1 | Transformer 40:1, Polaroid No.605541 |
| X1 | Crystal, 8.0 MHZ |
| U1, U2 | IC, Quad OP-AMP, MC 33074 |
| U6 | IC, Reset Circuit, MC33064P-5 |
| Q1 | Transistor, MMBTA42, SMO |
| Q2 | Transistor, Darlington, MMBTA14, SMO |
| D1, D2 | Diode, 1N4006 |
| D3 + 4, D5 + 6, D7 + 8 | Diode Pair, SMO MMB04000 |
| D20 | Diode, 1N914 |
| C36 | Capacitor, Electrolytic, 220 $\mu$F, 50 VDC |
| C2 | Capacitor, Tantalum, 10 $\mu$F, 10%, 5 VDC |
| C1 | Capacitor, Polyester, 0.022 $\mu$F, 10%, 400 VDC |
| C3, C4, C6, C12,C13,C21, C22, C23 | Capacitor, Ceramic Chip, 0.1 $\mu$F 10%, 50 VDC, X7R, SMO |
| C7, C8 | Capacitor, Ceramic Chip, .001 $\mu$F, 10%, 50 VDC, X7R, SMO |
| C10 | Capacitor, Ceramic Chip, 470pF, 5%, 50 VDC, C06, SMO |
| C11 | Capacitor, Ceramic Chip, 390 pF, 5%, 100 VDC, C06, SMO |
| C5 | Capacitor, Ceramic Chip, 100pF, 5%, 100 VDC, C06, SMO |
| C33, C34 | Capacitor, Ceramic Chip, 27pf, 10%, 200 VDC C06, SMO |
| C35 | Capacitor, .01 $\mu$f |
| R2, R6 | Resistor, SMO, 7.5(Ohms), 5%, $\frac{1}{8}$W |
| R54 | Resistor, SMO, 402, 1%, $\frac{1}{8}$W |
| R11 | Resistor, SMO, 787, 1%, $\frac{1}{8}$W |
| R52 | Resistor, SMO, 1.33K, 1%, $\frac{1}{8}$W |
| R1, R3, R5, R26 | Resistor, SMO, 2.0K, 5%, $\frac{1}{8}$W |
| R25 | Resistor, SMO, 2.10K, 1%, $\frac{1}{8}$W |
| R18 | Resistor, SMO, 2.55K, 1%, $\frac{1}{8}$W |
| R78 | Resistor, SMO, 2.61K, 1%, $\frac{1}{8}$W |
| R10 | Resistor, SMO, 3.32K, 1%, $\frac{1}{8}$W |
| R53 | Resistor, SMO, 3.24K, 1%, $\frac{1}{8}$W |
| R17 | Resistor, SMO, 5.11K, 1%, $\frac{1}{8}$W |
| R22 | Resistor, SMO, 5.23K, 1%, $\frac{1}{8}$W |
| R8, R21, R79 | Resistor, SMO, 10K, 5%, $\frac{1}{8}$W |
| R16 | Resistor, SMO, 11K, 5%, $\frac{1}{8}$W |
| R1 | Resistor, SMO, 16K, 5%, $\frac{1}{8}$W |
| R4, R7, R13, R14, R15 | Resistor, SMO, 20K, 5%, $\frac{1}{8}$W |
| R19, R20 | Resistor, SMO, 40.2K, 1%, $\frac{1}{8}$W |
| R23, R24, R27 | Resistor, SMO, 51.1K, 1%, $\frac{1}{8}$W |
| R9 | Resistor, SMO, 100K, 5%, $\frac{1}{8}$W |
| R31a,R32a | Resistor, SMO, 400K, 5%. $\frac{1}{8}$W |
| R77 | Resistor, SMO, 10 H, 5%, $\frac{1}{8}$W |
| RT1 | Thermister, 10K, 250 C |

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A distance measuring system, comprising:
   a transducer for generating at a transmit time a transmit pulse towards a surface the distance to which is to be measured and for receiving a plurality of echo signals reflected from the surface and from other surfaces exposed to the transmit pulse;
   means for determining a trailing edge time for each echo signal, the trailing edge time being defined as the time at which an amplitude of an echo signal crosses a threshold with a negative slope; and
   means for determining a distance value from the transmit time and the trailing edge time of the last of said a minimum amplitude.

2. The distance measuring system of claim 1, wherein:
   the minimum amplitude is a certain proportion of a maximum amplitude of the echo signals.

3. A method for measuring a distance between a transducer and a surface, comprising the following steps:
   a) transmitting at a transmit time an acoustic signal from the transducer so that the transducer receives reflected echo signals, including an echo signal reflected from the surface;
   b) determining amplitude and time data for a maximum echo signal having a peak amplitude which is larger than the peak amplitude of all the other echo signals received by the transducer;
   c) from the amplitude and time data for the maximum echo signal, determining an estimated multiple echo amplitude and an estimated multiple echo time for an echo signal which could result from multiple reflections of the transmit pulse;
   d) determining whether the amplitude of a particular echo signal exceeds a certain minimum amplitude;
   e) if the amplitude of said particular echo exceeds said certain minimum amplitude and the particular echo signal was received before the estimated multiple echo time, determining the distance value from the transmit time and a time of said particular echo signal; and
   f) if the amplitude of said particular echo signal exceeds the certain minimum amplitude and said particular echo signal was received not before the multiple echo time and the amplitude of said particular echo signal exceeds the estimated multiple echo amplitude, determining the distance value from the transmit time and a time of said particular echo signal.

4. The method of claim 3, wherein:
   the distance value is determined from the transmit time and from a trailing edge time of the particular echo signal, the trailing edge time of an echo signal corresponding to a time at which a distance corrected amplitude of the echo signal crosses a threshold value.

5. The method of claim 3, wherein:
   the distance value is determined from the transmit time and from a trailing edge time of the particular echo signal, the trailing edge time of an echo signal corresponding to a time at which an amplitude of the echo signal is decreasing and crosses a threshold value.

6. The method of claim 3, wherein:
   the distance value is determined form the transmit time and from a trailing edge time of the particular echo signal.

7. The method of claim 3, wherein:
   the multiple echo amplitude differs from the certain minimum amplitude.

8. The method of claim 3, wherein:
   minimum amplitude is derived as a certain proportion of a largest amplitude of all echo signals received by the transducer.

9. The method of claim 3, wherein:
   the estimated multiple echo amplitude is derived as a certain proportion of a largest amplitude of all echo signals received by the transducer.

10. The method of claim 3, wherein:
    if the particular echo signal was received before the multiple echo time, the distance value is determined from the transmit time and from a trailing edge time of said particular echo if said particular echo has a distance-corrected amplitude which exceeds a certain minimum amplitude.

11. A distance measuring system comprising:
    a transceiver for transmitting a transmit signal towards a surface, the distance to which is to be measured, and for receiving echo signals reflected from the surface;
    a plurality of amplifiers, each receiving the echo signals, having a different amplifier gain generating a different amplified echo signal;
    a signal processing unit receiving the amplified echo signals form all of the amplifiers, the unit comprising means for deriving a distance value from the amplified echo signal from a selected one of the amplifiers; and
    the unit further comprising means for automatically changing said selection as a function of the amplitude of the amplified echo signal.

12. The distance measuring system of claim 11, further comprising:
    means for causing the transceiver to periodically generate a plurality of transmit pulses, and
    means for generating an alarm signal if no echo signals are received by the response to at least a certain number of transmit pulses.

13. The distance measuring system of claim 12, further comprising:
    means for slew-rate limiting the distance values.

14. The distance measuring system of claim 11, wherein the means for automatically changing comprises:
    means for determining a maximum amplitude of the amplified echo signals;
    means for comparing the maximum amplitude to a first limit value and selecting a channel with a smaller gain if the maximum amplitude exceeds the first limit value;
    means for comparing the maximum amplitude to a second limit value and selecting a channel with a higher gain if the maximum amplitude is less than the second limit value.

15. The distance measuring system of claim 11, further comprising:
    means for setting a threshold value;

means for determining leading edge times as the times at which distance corrected echo signal amplitudes cross the threshold value with a positive slope;

means for determining trailing edge times as the times at which distance corrected echo signal amplitudes cross the threshold with a negative slope; and means for deriving distance values from a transmit time of the transmit signal and the leading and trailing edge times.

16. The distance measuring system of claim 15, further comprising:

means for automatically adjusting the threshold value as a function of a distance corrected maximum amplitude of the echo signals.

17. The distance measuring system of claim 15, wherein:

a near distance value is determined from the leading edge time of the first amplified echo signal which has a distance corrected amplitude which exceeds a certain fraction of a distance corrected maximum amplitude of the amplified echo signals.

18. The distance measuring system of claim 15, wherein:

a far distance value is determined from the trailing edge time of the last amplified echo signal which has a distance corrected amplitude which exceeds a certain minimum amplitude.

19. A distance measuring system, comprising:

a transducer for generating at a transmit time a transmit pulse towards a surface the distance to which is to be measured and for receiving a plurality of echo signals reflected from the surface and from other surfaces exposed to the transmit pulse;

means for determining amplitude and time data for a maximum echo signal having a peak amplitude which is larger than the peak amplitude of all the other echo signals;

means for, from the amplitude and time data for the maximum echo signal, determining an estimated multiple echo amplitude and an estimated multiple echo time for an echo signal which would result from multiple reflections of the transmit pulse; and means for determining a trailing edge time for each echo signal, the trailing edge time being defined as the time at which an amplitude of an echo signal crosses a threshold with a negative slope; and means for determining a distance value from the transmit time and the trailing edge time of the last of said plurality of echo signals which has an amplitude which exceeds a minimum amplitude and which exceeds the estimated multiple echo amplitude if said last echo signal occurs after the estimated multiple echo time.

* * * * *

UNITED STATES PATENT AND TRADEMARK OFFICE
CERTIFICATE OF CORRECTION

PATENT NO. : 5,060,205
DATED : 22 October 1991
INVENTOR(S) : James Joseph Phelan It is certified that error appears in the above-identified patent and that said Letters Patent is hereby corrected as shown below:

In Col. 7, line 20, after "said", insert -- plurality of echo signals which has an amplitude which exceeds --.

In Col. 8, line 4, delete "form" and insert -- from --.

In Col. 8, line 34, delete "form" and insert -- from --.

Signed and Sealed this

Twenty-fifth Day of May, 1993

Attest:

*Attesting Officer*

MICHAEL K. KIRK

*Acting Commissioner of Patents and Trademarks*